(12) United States Patent
Galla (10) Patent No.: US 11,215,778 B2
(45) Date of Patent: Jan. 4, 2022

(54) CABLE SEALS WITH REINFORCEMENTS

(71) Applicant: COMMSCOPE TECHNOLOGIES LLC, Hickory, NC (US)

(72) Inventor: Matthew P. Galla, Holly Springs, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/979,435

(22) PCT Filed: Mar. 8, 2019

(86) PCT No.: PCT/US2019/021261
§ 371 (c)(1),
(2) Date: Sep. 9, 2020

(87) PCT Pub. No.: WO2019/173663
PCT Pub. Date: Sep. 12, 2019

(65) Prior Publication Data
US 2021/0011240 A1   Jan. 14, 2021

Related U.S. Application Data

(60) Provisional application No. 62/640,712, filed on Mar. 9, 2018.

(51) Int. Cl.
*G02B 6/44* (2006.01)
(52) U.S. Cl.
CPC ................... *G02B 6/4444* (2013.01)
(58) Field of Classification Search
None
See application file for complete search history.

(56) References Cited

U.S. PATENT DOCUMENTS

| | | | |
|---|---|---|---|
| 4,639,388 A | | 1/1987 | Ainsworth et al. |
| 4,865,905 A | | 9/1989 | Uken |
| 4,880,676 A | * | 11/1989 | Puigcerver ........... H02G 15/013 |
| | | | 428/35.7 |
| 5,455,391 A | | 10/1995 | Demesmaeker et al. |
| 5,529,508 A | | 6/1996 | Chiotis et al. |
| 5,828,005 A | * | 10/1998 | Huynh-Ba ........... H02G 15/007 |
| | | | 174/92 |
| 6,005,041 A | | 12/1999 | Cook |
| 6,046,406 A | | 4/2000 | Milanowski et al. |

(Continued)

FOREIGN PATENT DOCUMENTS

| | | |
|---|---|---|
| EP | 0 442 941 B1 | 1/1995 |
| EP | 0 587 616 B1 | 7/1996 |

(Continued)

OTHER PUBLICATIONS

International Search Report and Written Opinion of the International Searching Authority for International Patent Application No. PCT/US2019/021261 dated Jun. 20, 2019, 8 pages.

(Continued)

*Primary Examiner* — Chad H Smith
(74) *Attorney, Agent, or Firm* — Merchant & Gould P.C.

(57) ABSTRACT

Aspects of the present disclosure relate to structures and designs that allow gels to be used to conform freely to optical cables while simultaneously minimizing the displacement of the gel due to deformation forces acting on the gel.

23 Claims, 8 Drawing Sheets

(56) References Cited

U.S. PATENT DOCUMENTS

| | | | |
|---|---|---|---|
| 6,116,614 A | 9/2000 | Wambeke et al. | |
| 6,132,867 A | 10/2000 | Hammond et al. | |
| 7,201,596 B1 * | 4/2007 | Bukovnik | H01R 4/70 439/276 |
| 7,603,018 B2 | 10/2009 | Mullaney et al. | |
| 7,799,995 B2 | 9/2010 | Mullaney et al. | |
| 8,178,783 B2 | 5/2012 | Yaworski et al. | |
| 8,337,980 B2 | 12/2012 | Hubbs | |
| 8,354,170 B1 | 1/2013 | Henry et al. | |
| 8,434,748 B1 | 5/2013 | Pearce et al. | |
| 9,556,336 B2 | 1/2017 | Berghmans et al. | |
| 9,587,108 B2 | 3/2017 | Boday et al. | |
| 2006/0103044 A1 | 5/2006 | Cate et al. | |
| 2012/0255759 A1 | 10/2012 | Pullium, III et al. | |
| 2014/0151084 A1 | 6/2014 | Spalding | |
| 2014/0314381 A1 | 10/2014 | Adams et al. | |
| 2016/0068648 A1 | 3/2016 | Miller et al. | |
| 2019/0219785 A1 * | 7/2019 | Radelet | H02G 15/06 |

FOREIGN PATENT DOCUMENTS

| | | |
|---|---|---|
| FR | 2 812 368 A1 | 2/2002 |
| JP | 2000-92681 * | 3/2000 |
| JP | 2015-531876 A | 11/2015 |
| WO | 99/41531 A1 | 8/1999 |
| WO | 2011/123018 A1 | 10/2011 |
| WO | 2014/005916 A2 | 1/2014 |
| WO | 2014/128137 A2 | 8/2014 |
| WO | 2014/209994 A2 | 12/2014 |
| WO | 2018/048910 A2 | 3/2018 |

OTHER PUBLICATIONS

Aleman, J. et al., "Definitions of Terms Relating to the Structure and Processing of Sols, Gels, Networks, and Inorganic-Organic Hybrid Materials (IUPAC Recommendations 2007)", Pure Appl. Chem., 79(10): 1801-1829 (2007).

Matsuzaki, R. et al., "Three-dimensional printing of continuous-fiber composites by in-nozzle impregnation", Nature, 1-7 (2016).

"Sonderhoff and AMB Technic at the PLASTPOL 2016—a highlight for sealing solutions", Sonderhoff Press Release, 1-5 (2016).

Stanton, M. et al., "Bioprinting of 3D hydrogels", Lab Chip, 15: 3111-3115 (2015).

Yu, Y. et al., "Fabrication of hierarchical polycarprolactone/gel scaffolds via combined 3D bioprinting and electrospinning for tissue engineering", Adv. Manuf. 2: 231-238 (2014).

* cited by examiner

CABLE SEALS WITH REINFORCEMENTS

CROSS-REFERENCE TO RELATED APPLICATION

This application is a National Stage Application of PCT/US2019/021261, filed on Mar. 8, 2019, which claims the benefit of U.S. Patent Application Ser. No. 62/640,712, filed on Mar. 9, 2018, the disclosures of which i-s are incorporated herein by reference in their entireties. To the extent appropriate, a claim of priority is made to each of the above disclosed applications.

TECHNICAL FIELD

The present disclosure relates generally to cable sealing gels used for sealing telecommunications cables and to methods for producing the cable sealing gels.

BACKGROUND

Telecommunications networks often use enclosures for containing and protecting telecommunications equipment (e.g., splice locations, optical splitters, multi-plexers, connection panels, etc.). Enclosures used in outside environments are desirably sealed to prevent moisture intrusion. Example gel sealed enclosures are disclosed by U.S. Pat. No. 7,603,018, International Publication Nos. WO-99/41531, and WO-2014/128137 A2.

Pressurized gel-type seals have been used to effectively seal the locations where telecommunications cables enter and exit telecommunications enclosures. Example pressurized gel-type seals are disclosed by EP 0442941B1; EP 0587616B1; U.S. Pat. Nos. 5,455,391; 6,046,406 and WO 2014/005916.

While gel seals have been effective at sealing cable entry locations, there is a need for constructing gel seals in a way that can address multiple structural issues and can meet the structural, mechanical, and geometrical capabilities necessary for obtaining a proper seal. Furthermore, there is a need for constructing gel seals that minimize the displacement of gel due to a pressure differential between the inside of a closure and the environment.

Improvements are needed in the area of composite gel constructions and methods of manufacturing such constructions.

SUMMARY

Aspects of the present disclosure relate to structures and designs that allow gels to be used to conform freely to optical cables while simultaneously minimizing the displacement of the gel due to deformation forces acting on the gel.

Features of the present disclosure relate to cable seals that provide a seal useful for sealing optical fiber cables. The cable seals can also provide a seal useful for electrical cables (e.g., with copper conductors), fiber optic cables, power cables, co-axial cables, twisted pair cables, drop cables, round cables, flat cables, distribution cables, multi-fiber cables, single fiber cables, ribbon cables, or other cables. The cable seals can also be used for sealing enclosures such as telecommunications enclosures. The cable seals can be of a gel-type structure including a plurality of tensile reinforcing elements embedded therein.

Aspects of the present disclosure relate to a cable sealing arrangement for sealing telecommunications enclosures and in particular for sealing cable entry locations into telecommunications enclosures. Certain aspects of the present disclosure relate to cable seals including volumes of sealant (e.g., gel) that are reinforced by reinforcing elements to alter the force transfer dynamics within the sealant as compared to sealant without reinforcement. In certain examples, reinforcing elements are embedded within the sealant and are bonded to the sealant along their lengths. In certain examples, the reinforcing elements are tensile reinforcing elements that do not stretch in a meaningful way during normal expected use of the cable seal. Example reinforcing elements can include bendable (e.g., flexible) reinforcing elements that provide tensile reinforcement while not providing meaningful compressive reinforcement. Examples of this type of tensile reinforcing elements include string-like reinforcing elements such as reinforcing elements including Aramid yarn or other yarns. Other types of flexible reinforcing elements can include plastic or metal cantilever-like reinforcing elements that in certain examples are adapted to provide both tensile and compressive reinforcement to the volume of sealant, and also to optionally apply spring load to the sealant. In certain examples, the reinforcing elements can be configured to allow the cable sealant to readily deform to accommodate cables of different sizes and shapes, while concurrently reinforcing the volume of sealant to provide enhanced containment of the sealant at exterior and/or interior boundaries of the sealant relative to the enclosure.

Another aspect of the present disclosure relates to anisotropic cable seals that provide a seal useful for sealing optical fiber cables, electrical cables (e.g., with copper conductors), fiber optic cables, power cables, co-axial cables, twisted pair cables, drop cables, round cables, flat cables, distribution cables, multi-fiber cables, single fiber cables, ribbon cables, or other cables. The anisotropic cable seals can also be used for sealing enclosures such as telecommunications enclosures. The anisotropic cable seals provide anisotropic deformation characteristics. The anisotropic cable seals can be of a gel-type structure. Cable seals with anisotropic deformation characteristics are defined as cable seals that have a preferred direction of deformation in which deformation is greater in one direction than in others. As a result, the anisotropic cable seals can have different properties in different orientations. Seals in accordance with the principles of the present disclosure can also be used for sealing applications such as for sealing interfaces between mating pieces of an enclosure.

The cable seal comprises a volume of gel. The cable seal can include an x-dimension that extends a long an x-axis, a y-dimension that extends along a y-axis, and a z-dimension that extends along a z-axis. The anisotropic deformation characteristics of the cable seal allows it to deform less in a cable pass-through direction along the z-axis as compared to at least one of the x and y axes in order to help improve the seal about the optical fiber cable.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The present disclosure generally relates to a cable seal or other sealing structures. An example cable seal can have a construction with anisotropic deformation characteristics that allow the cable seal to be less deformable in one direction than in others. The cable seal can be utilized to seal fiber optic cables more uniformly while limiting the potential of leakage (e.g., triple points).

As used herein, the term, "anisotropic," is defined as having physical properties that are different in measurement along different axes or directions. Therefore, cable seals can have a construction that exhibit an anisotropic behavior such that the cable seals deform more easily or in one direction more than in another. Thus, the cable seal can have a construction in which deformation is preferred in one or more orientations as compared to one or more other orientations.

In one example, cable seals may comprise gel and/or gel combined with another material such as an elastomer, although alternatives are possible. For example, the gel may comprise silicone gel, urea gel, urethane gel, thermoplastic gel, or any suitable gel or geloid sealing material.

Gels are normally substantially incompressible (e.g., like a liquid) when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers.

In other examples, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The cable seals can also include additives such as moisture scavengers, antioxidants, tackifiers, pigments and/or fungicides.

Suitable gels also include those comprising silicone, e.g. a polyorganosiloxane system, polyurethane, polyurea, styrene-butadiene copolymers, styrene-isoprene copolymers, styrene-(ethylene/propylene)-styrene (SEPS) block copolymers (available under the tradename Septon™ by Kuraray), styrene-(ethylene-propylene/ethylene-butylene)-styrene block copolymers (available under the tradename Septon™ by Kuraray), and/or styrene-(ethylene/butylene)-styrene (SEBS) block copolymers (available under the tradename Kraton™ by Shell Oil Co.). Suitable extender fluids include mineral oil, vegetable oil, paraffinic oil, silicone oil, plasticizer such as trimellitate, or a mixture of these, generally in an amount of 30 to 90% by volume of the total weight of the gel.

In certain examples, the gel may be a thermosetting gel, e.g. silicone gel, in which the crosslinks are formed through the use of multifunctional crosslinking agents, or a thermoplastic gel, in which microphase separation of domains serves as junction points. Thermoplastic elastomers, unlike thermoset elastomers, can be processed using melt processing techniques.

Thermosetting gels are typically based on silicone chemistry, e.g. a polyorganosiloxane system, and result in a chemically cross linked gel. For example, divinyl polydimethyl siloxane compounds of up to 80,000 cSt viscosity may be used with tetra or tri hydride cross linking agents (such as tetrakis dimethyl siloxy silane, SIT 7278 from Gelest for example), and cross link the divinyl using a platinum catalyst. The cross link density is kept low by extending the system with non-reactive polydimethyl siloxane (silicone fluid). Typical formulations contain 60-70% silicone fluid, 30-40% divinyl siloxane (80,000 cSt viscosity), 1-2% cross linking agent and 5-100 ppm catalyst.

Thermoplastic gels are typically based on mixing some type of extender (usually hydrogenated, refined, paraffin oil—70% paraffin, with a fairly high molecular weight) with block copolymers. The block copolymers are usually based on styrene and a rubber midblock such as Kraton G1651 (hydrogenated ethylene butylene midblock) or Septon 2006 (ethylene propylene midblock). The block copolymers can be styrene-ethylene butylene-styrene SEBS (tri block) for example or styrene-ethylene butylene SEB (diblock) for example. Typical diblock copolymers include Kraton G1701H, G1702H, Septon S1001. Typical triblock copolymers include Kraton G1651H, G1652M, G1654H, Septon S8004 and S2006. The hardness may be adjusted by varying the ratio of diblock to triblock and the amount of extender added. Thermoplastic gel formulations may range from 6% rubber to 30% rubber and 80% diblock (of the total rubber amount) to no diblock. Optionally other additives may be included in the formulations including UV stabilizers, corrosion inhibitors, fungicide, antioxidants, pigment, etc.

The term "thermoplastic elastomer" refers to an elastomer comprising a thermoreversible network. (Definitions of terms relating to the structure and processing pf sols, gels, networks, and inorganic-organic hybrid materials-IUPAC Recommendations 2007-Pure Appl. Chem., Vol. 79, No. 10, pp. 1801-1829, 2007, p. 1811). Thermoplastic elastomers (TPE), sometimes referred to as thermoplastic rubbers, are a class of copolymers or a physical mix of polymers (usually a plastic and a rubber) which consist of materials with both thermoplastic and elastomeric properties.

The term "thermoplastic" refers to a polymer that softens when exposed to heat and returns to a more rigid condition when cooled. These polymers can typically go through repeated melting and freezing cycles, and can be reshaped upon reheating.

Thermoplastic polymers typically are high-molecular weight polymers, have a chain length capable of forming entanglements, or are longer than a persistence length (i.e., the length in which correlations in the direction of the tangent are lost). In certain embodiments, the thermoplastic polymer has a molecular weight greater than approximately 30,000 g/mol. These polymers may be amorphous or semi-crystalline in structure in their solid state. Examples of thermoplastic polymers include, but are not limited to compounds having a backbone containing: polyethylene, polypropylene, acrylonitrile butadiene styrene, acrylic, celluloid, cellulose acetate, cycloolefin copolymer, ethylene vinyl acetate, ethylene vinyl alcohol, fluorinated ethylene propylene, fluoroplastics, perfluoroalkoxy copolymer, polyacetal, polyacrylates, polyacryonitrile, polyamine, polyamide-imide, polyaryletherketone, polybutadiene, polybutylene, polybutylene terephthalate, polycaprolactone, polychlorotrifluoroethylene, polyethylene terephthalate, polycyclohexylene dimethylene terephthalate, polycarbonate, polyhydroxyalkanoates, polyketone, polyester, polyetheretherketone, polyetherketoneketone, polyetherimide, polyethersulfone, polyethylenechlorinates, polyethylene tetrafluoroethylene, polyimide, polylactic acid, polymethylpentene, polyphenylene oxide, polyphenylene sulfide, polyphthalamide, polystyrene, polysulfone, polytrimethylene terephthalate, polyurethane, polyvinyl acetate, polyvinyl chloride, polyvinylidene chloride, styrene-acrylonitrile, and combinations or copolymers thereof. In one embodiment, the thermoplastic polymer has a polyethylene backbone. In another embodiment, the thermoplastic polymer has an acrylic backbone. In still another embodiment, the thermoplastic polymer has a polymethyl methacrylate backbone. In yet another embodiment, the thermoplastic polymer has a butadiene backbone.

The gel can have measurable properties. For example, in some examples, the gel has a hardness in the range of 24 to 53 Shore 000 Hardness, or 80 to 300 g, as measured according to methods known in the art. In certain examples, the shore hardness gauge is measured according to ISO868, ISO 7619-1, or ASTM D2240. In other examples, hardness can be measured on a texture analyzer. For example, a LFRA Texture Analyzer-Brookfield may include a probe assembly fixed to a motor driven, bi-directional load cell. In such a system, the probe is driven vertically into the sample at a pre-set speed and to a pre-set depth. The hardness is the amount of force needed to push the probe into the test sample. In other examples, the gel has a hardness in the range of 37 to 45 Shore 000, or 160 to 220 g. In yet other examples, the gel has a hardness in the range of 38 to 42 Shore 000, or 170 to 200 g. In other examples, the gel has a hardness within 10 to 30 on the Shore-000 scale, within 30 to 60 on the Shore-000 scale, or within 10 to 25 on the Shore-000 scale.

In some examples, the gel has a durometer of less than 30 on the Shore-000 scale. In certain examples, the gel has a durometer in the range of 5 to 50 on the Shore-A scale. The measurement of the durometer does not include the reinforcing material, but relates only to the gel material.

In certain examples, the dry silicone gel comprises one or more of the following properties: (1) a hardness between 100 grams ("g") and 300 g as measured on a TA-XT2 texture analyzer from Texture Technologies, (or between 26-53 Shore 000 Hardness), (2) a stress relaxation between 40% and 60% when the gel is subjected to a deformation of 50% of its original size, (3) a compression set between 4% and 20% after 50% strain has applied to the gel for 1000 hours at 70 degrees C., and (4) less than 10% oil bleed out after being under compression of 1.2 atm for 60 days at 60 degrees C. It will be appreciated that there are lots of other test methods that may be used and properties that may be measurable.

In certain examples, cable seals in accordance with the principles of the present disclosure have ultimate elongations greater than 100 percent with substantially elastic deformation to an elongation of at least 100 percent.

In other examples, cable seals in accordance with the principles of the present disclosure have ultimate elongations of at least 200 percent, or at least 500 percent, or at least 1000 percent. Ultimate elongation can be determined by the testing protocol set forth at ASTM D412.

Figure 3:
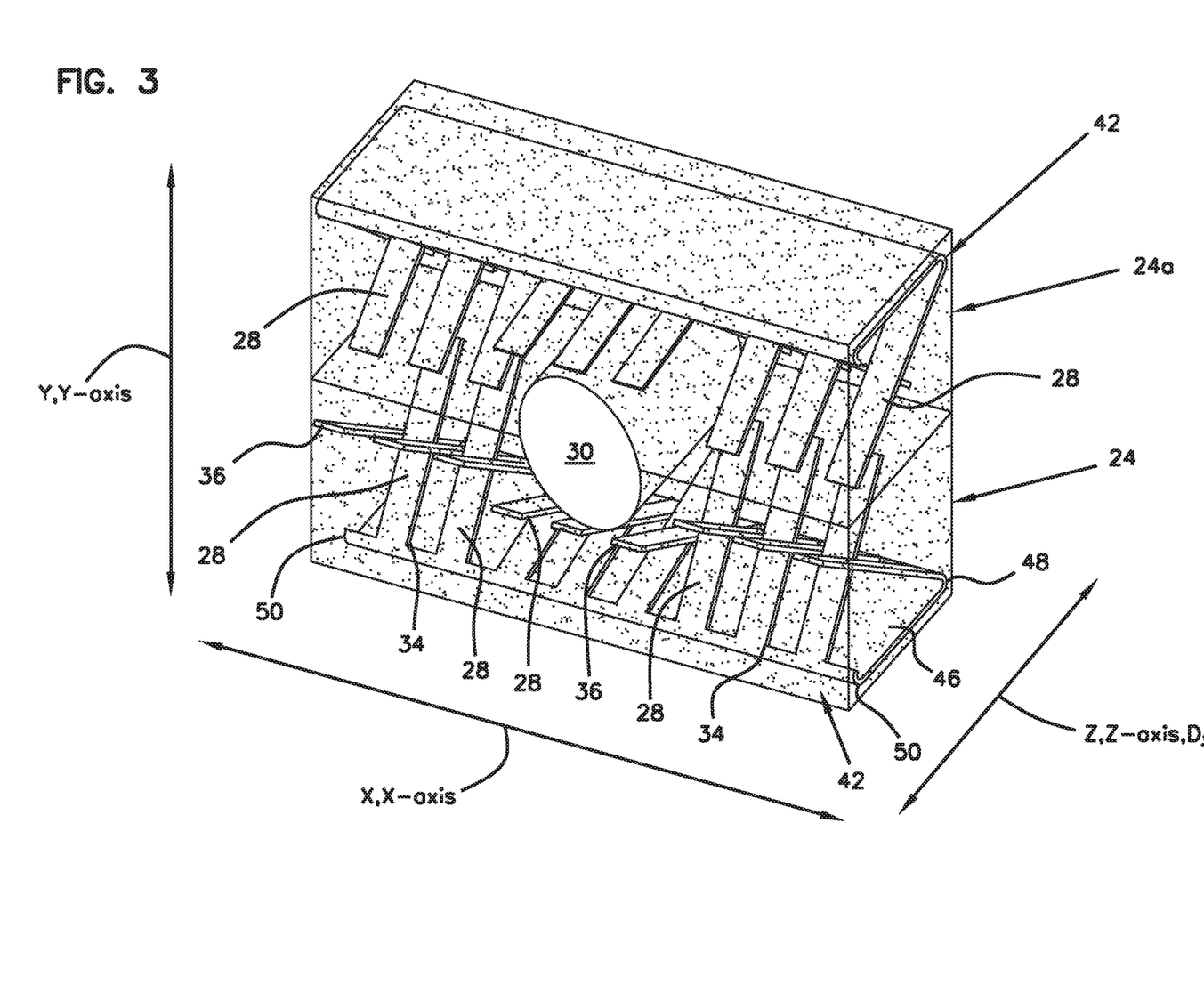
FIG. 3 illustrates schematic diagram of a perspective view of two cable seals positioned one on top of the other depicting a seal about a telecommunications cable in accordance with the principles of the present disclosure.

As described herein, the techniques of this disclosure may be implemented in many ways. For example, the techniques of this disclosure may be implemented in an optical termination enclosure (OTE) 10 as shown in FIG. 3, although alternative enclosures are possible. In one example, aspects of the present disclosure can be used to seal a housing (e.g., an enclosure, a cabinet, closure, box, pedestal, etc.). In certain examples, the housing can have a IP4x/IPx4 sealing performance or better.

Figure 1:
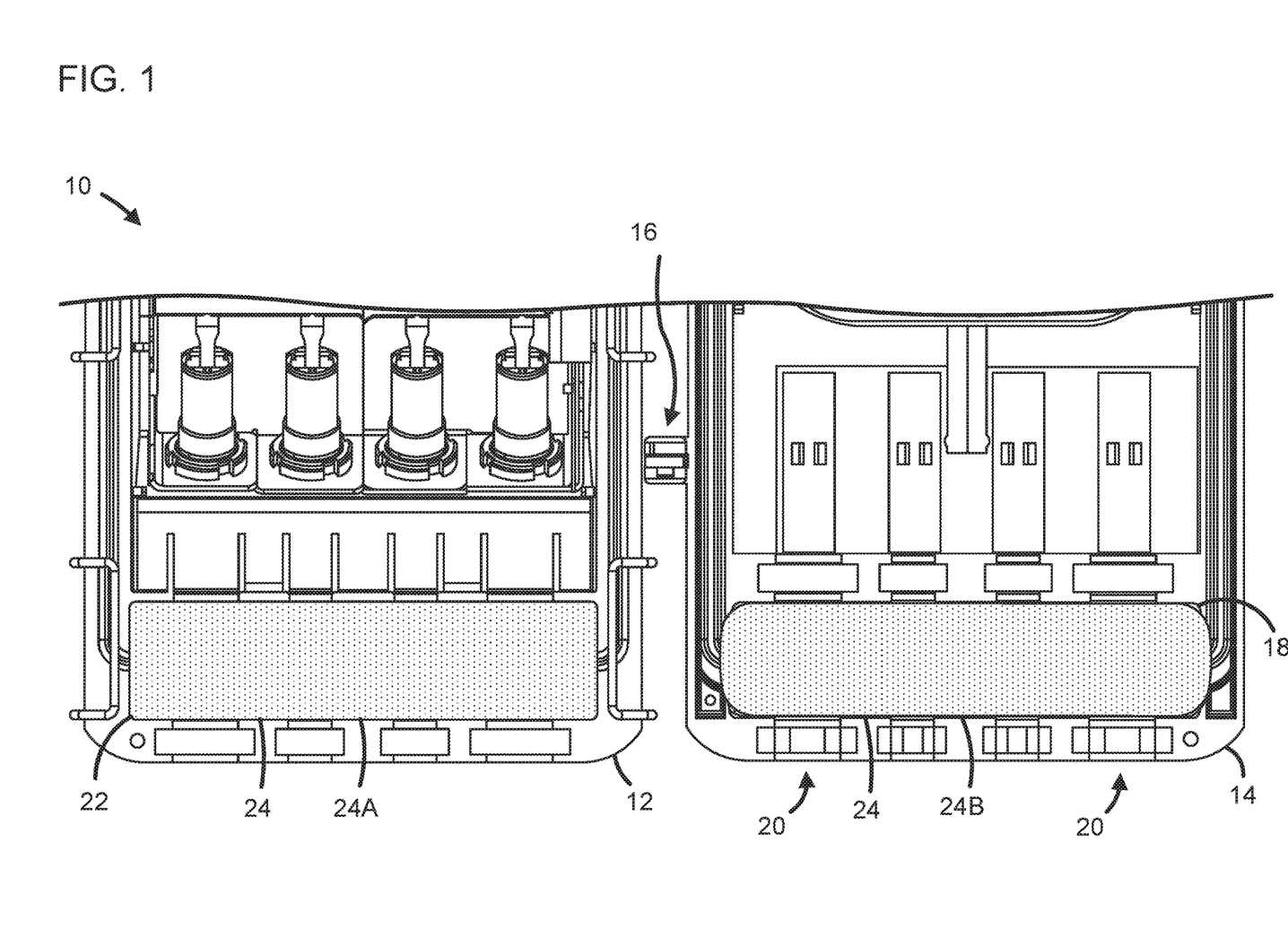
FIG. 1 illustrates a top view of an example enclosure showing a cable seal positioned therein.

Turning to FIG. 1, the enclosure 10 may include a lid member 12 and a base member 14 (also referred to herein as the housing). The enclosure 10 is preferably re-enterable and environmentally sealed. The lid member 12 and the base member 14 may be constructed of a variety of different types of materials including plastic, metal, and/or other types of materials. Hinges 16 can pivotally attach the lid member 12 to the base member 14. A set of latches (not shown) may be attached to one of the base member 14 or the lid member 12 to secure the parts together or provide latching therebetween, although alternatives are possible. For example, mechanical fasteners, such as, screws, bolts, clamps, or other mechanical fastening arrangements can be used.

The base member 14 can define a base sealing receptacle 18 and cable entry ports 20 through which a telecommunications cable (not shown) passes. The lid member 12 may also define a lid sealing receptacle 22 that mates or cooperates with the base sealing receptacle 18 when the lid member 12 and the base member 14 are in a closed position.

In certain examples, a cable seal 24 (e.g., a first cable seal, a composite sealing structure)(see FIG. 2) may be arranged and configured in the base and lid sealing receptacles 18, 22 of the enclosure 10. In certain examples, each entry port can be defined in part by the base member 14 and in part by the lid member 12, and cables can be sealed between the cable seal 24 of the base member 14 and the lid member 12. Because the cable seal 24 is relativity soft and deformable, the telecommunications cable deforms (e.g., pressurizes) the cable seal 24 when the cable seal 24 is pressurized as the enclosure 10 is moved toward the closed position.

It will be appreciated that the cable seal 24 positioned within the base sealing receptacle 18 and the lid sealing receptacle 22 may be different or identical. For example, the lid sealing receptacle 22 may include a cable seal 24A that is different in material and geometry compared to the cable seal 24B positioned in the base sealing receptacle 18, although alternatives are possible. In other examples, the cable seals 24A and 24B may both be identical with respect to their material compositions and geometries.

The cable seal 24 can also be contained more effectively within a telecommunications cable enclosure such that it is not necessary that the telecommunications cable enclosure match closely with a cable diameter. As such, the telecommunications cable enclosure can be arranged and configured to receive increased cable dimeter ranges without having a need for closure entry adaptions or cable size matching inserts. In some examples, pre-formed notches or passages can be formed in the cable seal 24 for receiving cables. In other examples, no pre-formed notches or openings are provided such that space for the cables is provided entirely by deformation of the cable seal 24. In some examples, relatively small pre-formed passages can accommodate a wide range of cable sizes. Pre-formed cable passages may or may not be provided at the sealing interface between two cable seals.

Thus, an advantage of the cable seal 24 is that a wider variety of cable sizes and shapes can be sealed with a single sealing structure and closure geometry. The cable seal 24 can provide for fewer variants in cable entry designs at the cable entry portion of an enclosure, which can make for a much simpler and more versatile seal that can be more cost effective and design insensitive. Also, less force can be required to make the gel accommodate to the cable, which can make installation easier and require less structure strength for the enclosure. For example, because of gel reinforcements of the type disclosed herein, a more flowable/deformable gel can be used for cable sealing such that less force is required to effectively deform the gel about a cable.

Figure 2:
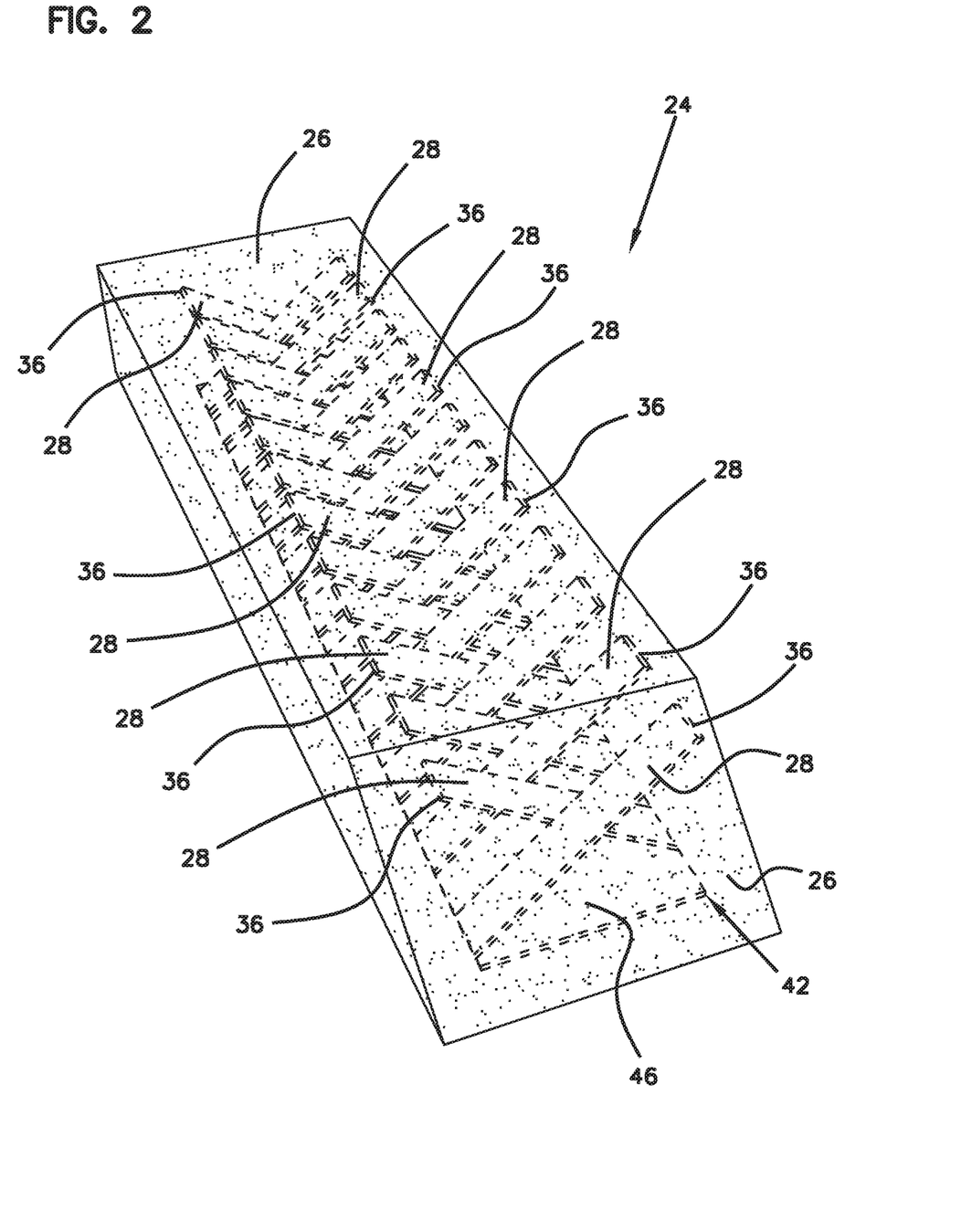
FIG. 2 illustrates a schematic diagram of an example cable seal including a volume of gel and a plurality of tensile reinforcing elements in accordance with principles of the present disclosure.

Turning to FIG. 2, the example cable seal 24 is depicted. The example cable seal 24 can include a volume of gel 26 and a plurality of tensile reinforcing elements 28 embedded in the volume of gel 26. In certain examples, the plurality of tensile reinforcing elements 28 can also be bonded to the volume of gel 26. In certain examples, the plurality of tensile reinforcing elements 28 can be coated with a primer (e.g., adhesive) to provide good adhesion with the volume of gel 26. In certain examples, gel can be molded with the reinforcements therein.

The plurality of tensile reinforcing elements 28 can also be arranged and configured such that the cable seal 24 can have any geometry. A suitable shape may be any desired shape, such as a geometric shape, e.g., a circle, square, rectangle, triangle, or combinations thereof.

Turning to FIG. 3, the cable seal 24 can cooperate with another cable seal 24a (e.g., second cable seal) to provide full sealing about a telecommunications cable 30. In certain examples, the cable seals 24, 24a can be applied in enclosures that may have axial and/or transversal compression designs. As such, in certain examples, axially and transversally compressible design assemblies may include reinforced cable seals positioned between two support structures or in a clamshell. The cable seals 24, 24a can meet at a sealed cable pass-through interface 32 (see FIG. 5) or sealed seam. That is, when the cable seals 24, 24a are positioned one on top of the other, the sealed cable pass-through interface 32 can be defined therebetween.

It will be appreciated that the cable seals 24, 24a may have identical material compositions and geometries, although alternatives are possible. For example, the cable seals 24, 24a may each have different material compositions and the cable seals 24, 24a may each have different geometries. It will be appreciated that the cable seals 24, 24a may be used with other cable seal structures.

Although rectangular gel blocks are depicted, it will be appreciated that the cable seals 24, 24a may be arranged and configured as a strip, or other type of arrangement such as a cylindrical block, a truncated triangular block, a wedge-shaped block, a portion of a cylinder, a portion of an annulus, or other shapes. The cable seals 24, 24a can be arranged and configured to mate or cooperate together in an enclosure to form a seal about a telecommunications cable. The cable seals 24, 24a each include the volume of gel 26 and plurality of tensile reinforcing elements 28. In the illustrated example, the cable seal 24 is identical to the cable seal 24a; as such, only the cable seal 24 will be described herein. Those of skill in this art will appreciate that the discussion of the cable seal 24 applies equally to the cable seal 24a. Also, in some examples the cable seals 24, 24a may not be identical.

The plurality of tensile reinforcing elements 28 can be arranged and configured in a desired arrangement (e.g., diagonally), although alternatives are possible. The diagonal configuration can be arranged from top to bottom in the cable seal 24. The plurality of tensile reinforcing elements 28 can be diagonally oriented relative to the sealed cable pass-through interface 32.

Each one of the plurality of tensile reinforcing elements 28 can include a base end 34 that can be anchored and a free end 36 that can be positioned near the sealed cable pass-through interface 32 when the cable seal 24 cooperates with the another cable seal 24a. That is, the free ends 36 of the plurality of tensile reinforcing elements 28 of the cable seal 24 can be positioned adjacent to the free ends 36a of the plurality of tensile reinforcing elements 28a of the cable seal 24a.

Figure 4:
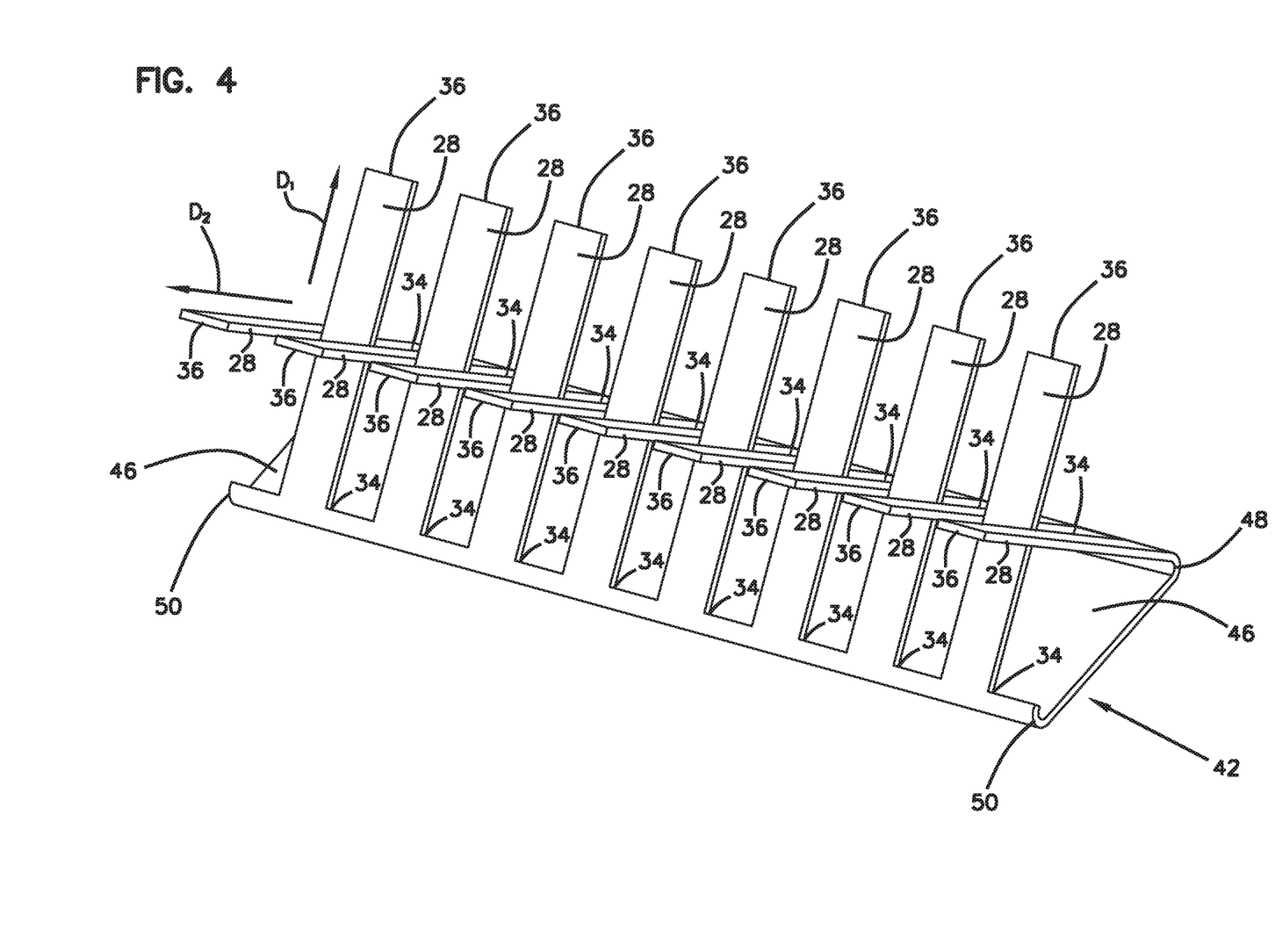
FIG. 4 illustrates a schematic diagram of the plurality of reinforcing elements attached to an intermediate structure in accordance with principles of the present disclosure.

Turning to FIG. 4, a schematic perspective view of the plurality of tensile reinforcing elements 28 is shown. In certain examples, the plurality of tensile reinforcing elements 28 can be attached to an intermediate structure 42 (e.g., rigid support structure), although alternatives are possible. In certain examples, the intermediate structure 42 may be integral with (e.g., made as unitary, monolithic component) the plurality of tensile reinforcing elements 28, although alternatives are possible. In certain examples, the plurality of tensile reinforcing elements 28 can be anchored to an enclosure without an additional rigid support structure.

In certain examples, the example cable seal 24 can optionally include the intermediate structure 42, although alternatives are possible. In certain examples, the intermediate structure 42 may be embedded in the volume of gel 26 of the cable seal 24. In certain examples, the intermediate structure 42 may be bonded to an endface 44 of the cable seal 24.

The intermediate structure 42 may be constructed of a variety of different types of materials including plastic, metal, and/or other types of materials.

In certain examples, the intermediate structure 42 may be coupled to (e.g., when the intermediate structure 42 is formed as a separate component) the plurality of tensile reinforcing elements 28. In certain examples, the base ends 34 of the plurality of reinforcing elements 28 may be anchored to a rigid structure.

As used herein, the term, "anchored" is defined as firmly securing, joining, fixing, fastening, attaching, bonding, tethering, in force transmitting relation with or otherwise connecting one item to another item (in a removable or non-removable) manner, either directly or via one or more intermediate items secured to the items described as "anchored" to one another in a manner appropriate for the specific items.

Figure 6:
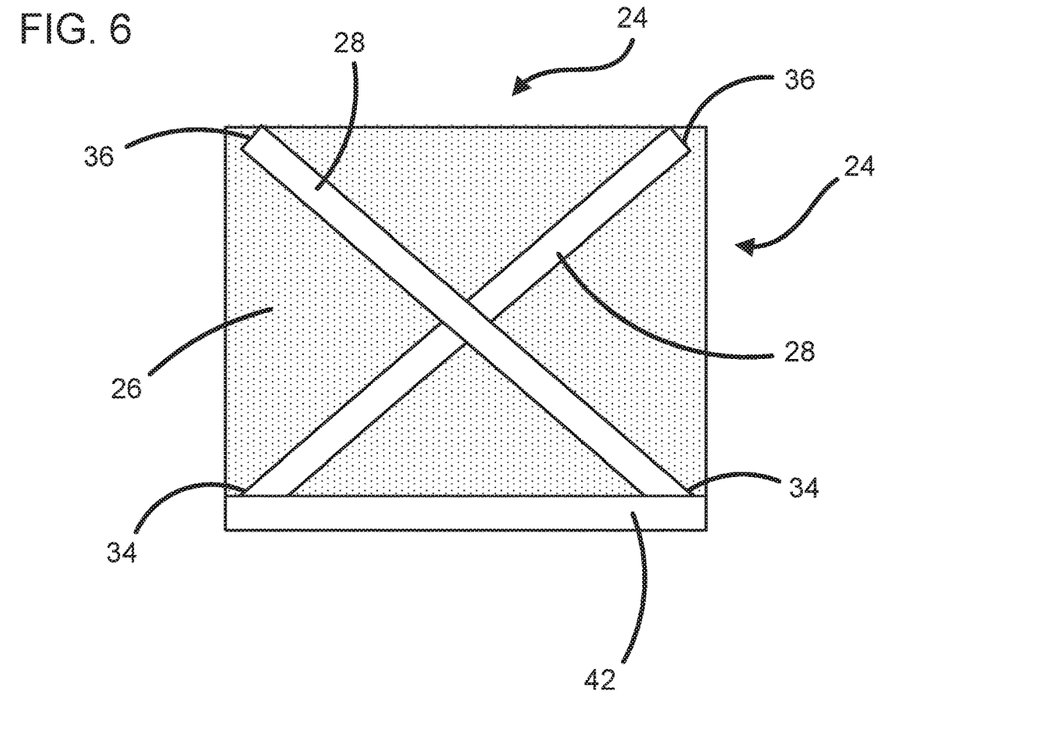
FIG. 6 illustrates an end view of the example cable seal shown in FIG. 2.

In certain examples, the base ends 34 can be anchored to the plate-like base 46 of the intermediate structure 42 as shown in FIG. 6, although alternatives are possible. In certain examples, the intermediate structure 42 can have a plate-like base 46.

In certain examples, the intermediate structure 42 may have a first-side edge 48 that extends along the plate-like base 46 and a second-side edge 50 that extends along the plate-like base 46, although alternatives are possible. In certain examples, the first and second side edges 48, 50 can be curved, although alternatives are possible. The plurality of tensile reinforcing elements 28 can respectively extend from the first and second side edges 48, 50 in first and second directions D1, D2 such that the plurality of reinforcing elements 28 are configured diagonally relative to the plate-like base 46 of the intermediate structure 42. That is, the base ends 34 of the plurality of reinforcing elements 28 may be anchored to the intermediate structure 42 at the first and second side edges 48, 50, although alternatives are possible.

Figure 5:
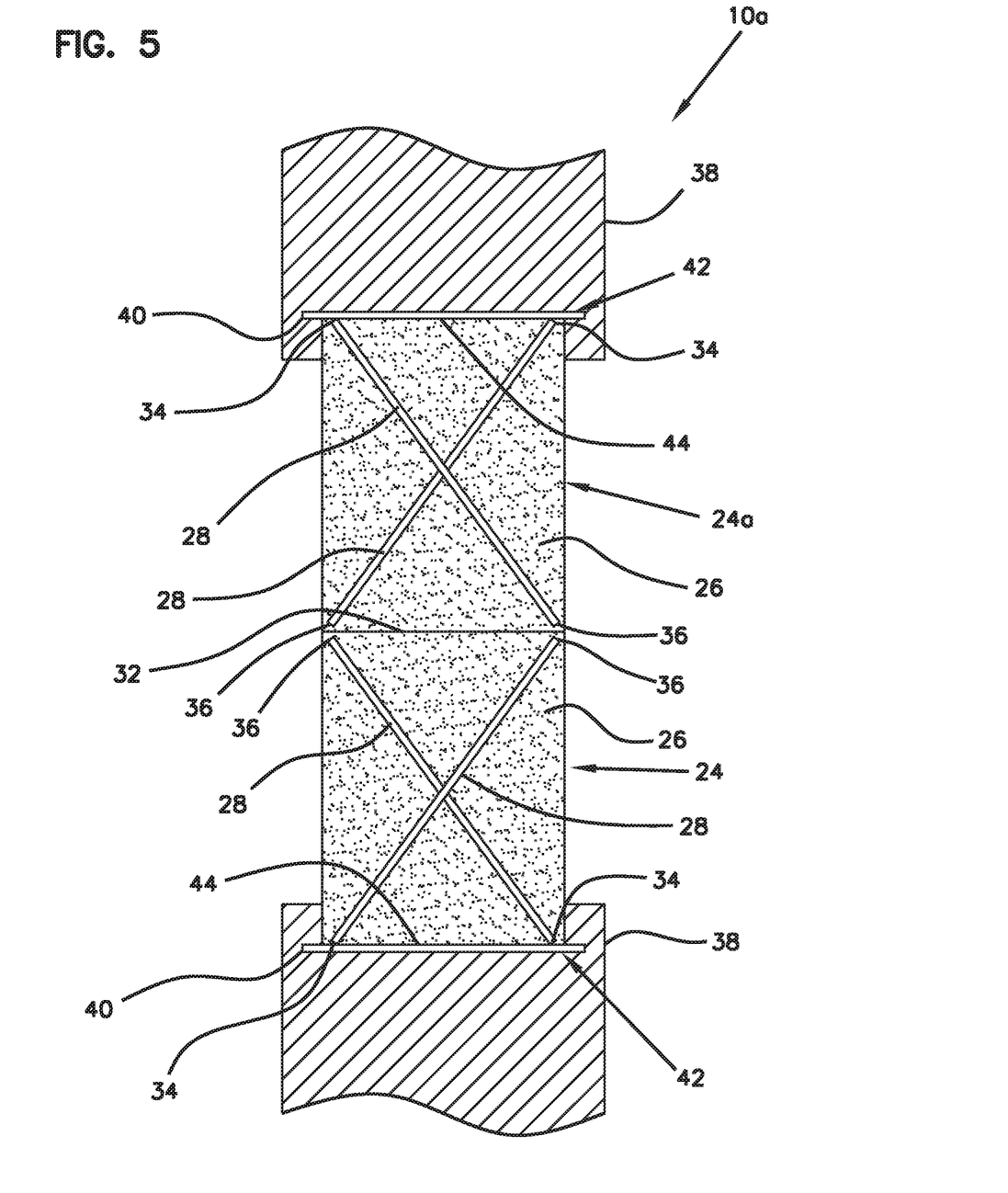
FIG. 5 illustrates is a schematic diagram of the cable seals shown in FIG. 3 with the intermediate structure positioned within an example telecommunications enclosure.

Turning to FIG. 5, the cable seals 24, 24a are schematically shown mounted within an enclosure 10a. The cable seals 24, 24a are shown positioned one on top of the other within a housing 38 of the example enclosure 10a. The cable seals 24, 24a, can each include the intermediate structure 42. The intermediate structure 42 can be respectively mounted to the endface 44 of the cable seals 24, 24a. The intermediate structure 42 can extend beyond the cable seals 24, 24a such that the first and second side edges 48, 50 are mounted within a cavity 40 of the housing 38.

Figure 7:
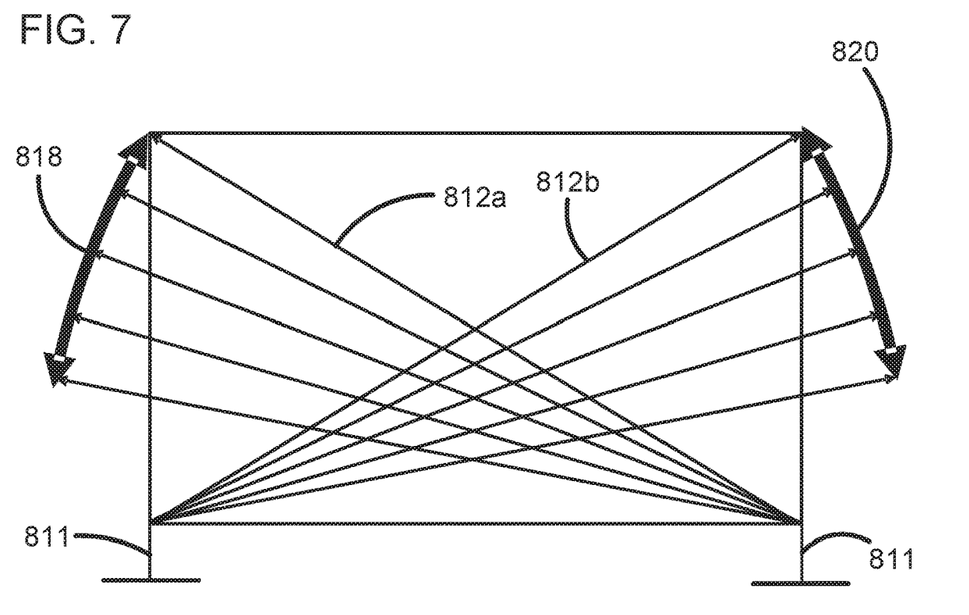
FIG. 7 illustrates a pivoting action of the plurality of reinforcing elements shown in FIG. 2.

In use, the enclosure 10a can be positioned in an environment in which the temperature inside the housing 38 varies between a relatively low temperature and a relatively high temperature. For example, the enclosure 10a may be positioned in an outdoor environment so that the source of the heat producing the temperature changes is solar and the heating/cooling cycle is intermittent. This may result in a pressure differential between the inside of the enclosure 10a and the environment. When pressure is applied to the cable seals 24, 24a, compressive forces acting thereon can skew the volume of gel 26 which can result in deformation. The plurality of tensile reinforcing elements 28 embedded in the volume of gel 26 of the cable seals 24, 24a can help to prevent such deformation from occurring. The plurality of tensile reinforcing elements 28 can provide tensile reinforcement to the cable seals 24, 24a where shear forces within the volume of gel 26 act to resist deformation. That is, when the cable seals 24, 24a starts to deform, the plurality of tensile reinforcing elements 28 therein are arranged and configured to move in a pivoting or curving motion to resist deformation as shown in FIG. 7. Because the free ends 36 of the plurality of tensile reinforcing elements 28 are not anchored, the plurality of tensile reinforcing elements 28 can rotate freely while the base ends 34 are anchored to the intermediate structure 42.

When a deformation force is applied to the volume of gel 26, the plurality of tensile reinforcing elements 28 can transfer tensile load to the housing 38. That is, the plurality of tensile reinforcing elements 28 can transfer tensile load to the intermediate structure 42 which can compress within the cavity 40 to apply the load to the housing 38 in order to resist deformation of the volume of gel 26. The intermediate structure 42 remains compressively captured between the cavity 40 of the housing 38 to transfer axial load thereon so that no deformation occurs on the volume of gel 26.

Depending on the direction of the deformation force acting on the cable seals 24, 24a, the plurality of tensile reinforcing elements 28 aligned along one of the first and second directions D1, D2 will pivot to resist deformation while the plurality of tensile reinforcing elements 28 aligned along the other one of the first and second directions D1, D2 can move freely with the shear forces within the volume of gel 26.

The plurality of tensile reinforcing elements 28 may be constructed of a variety of different types of materials including plastics, metals, fibers, yarns, braided textiles, aramid, foils, glass fibers, and/or other types of materials that can yield a low or medium bending stiffness that allow the plurality of tensile reinforcing elements 28 to move freely in the volume of gel 26 except in the tensile direction.

In certain examples, the cable seals 24, 24a can withstand a compressive force of at least 300 N to limit the amount of buckling or deformation. In certain examples, the cable seals 24, 24a can withstand a compressive force between a range of about 70 kPa to about 80 kPa. In other examples, the reinforcing elements 28 can provide both compressive and tensile reinforcement.

Figure 8:
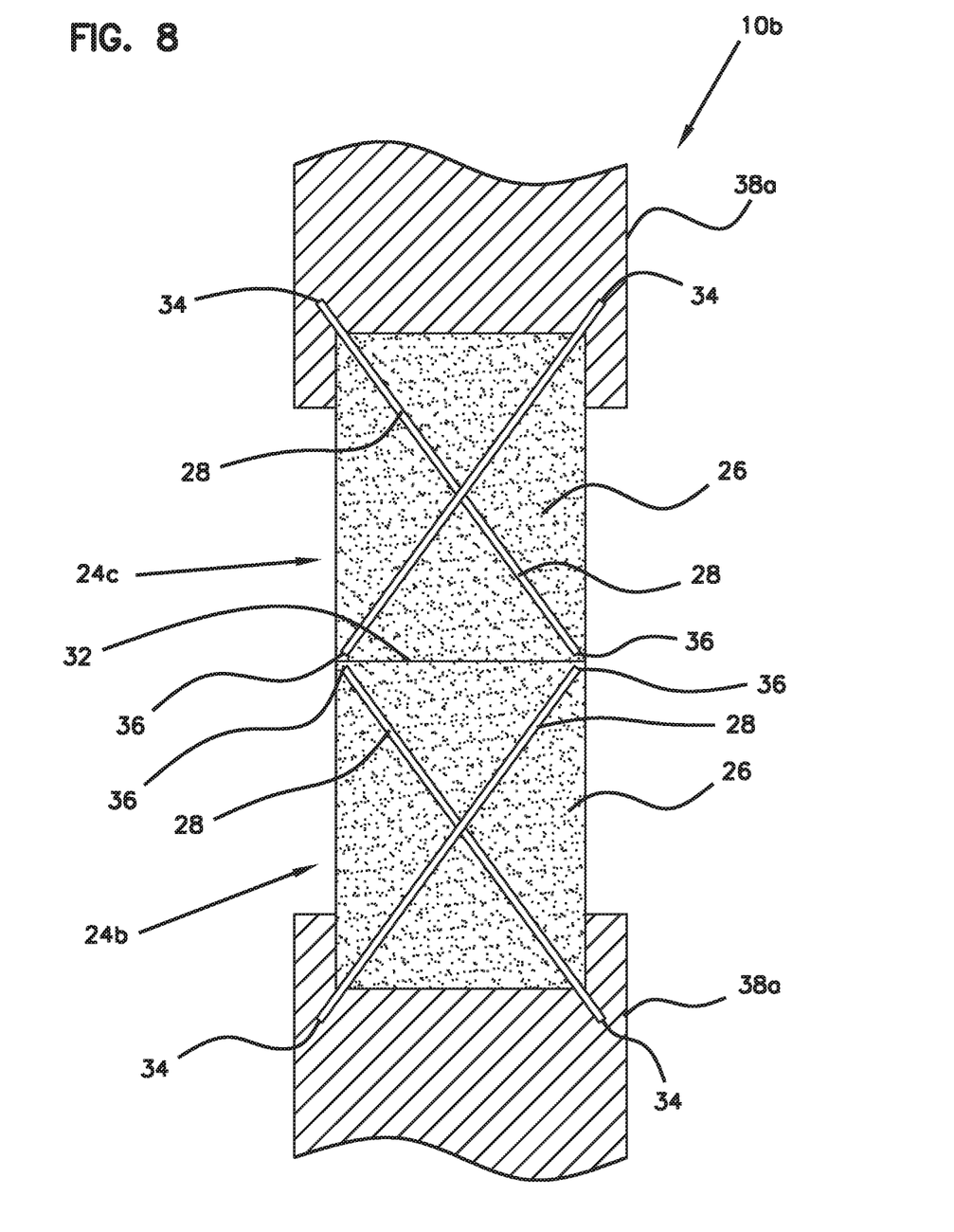
FIG. 8 illustrates is a schematic diagram of cable seals without the intermediate structure positioned within an example telecommunications enclosure in accordance with principles of the present disclosure.

Turning to FIG. 8, another example cable seals 24b, 24c is depicted within an enclosure 10b. The cable seals 24b, 24c are shown positioned one on top of the other within a housing 38a of the example enclosure 10a. The cable seals 24b, 24c depicted do not include an intermediate structure. Rather, the base ends 34 of the plurality of tensile reinforcing elements 28 extend outside of the volume of gel 26 and can be anchored directly to the housing 38a. As such, the plurality of tensile reinforcing elements 28 can transfer tensile load directly to the housing 38, although alternatives are possible.

In certain examples, the base ends 34 can be integrally molded with the housing 38a, although alternatives are possible. In certain examples, the base ends 34 can be coupled (e.g., attached, adhered, etc.) to the housing 38a, although alternatives are possible. In certain examples, the base ends 34 of the plurality of tensile reinforcing elements 28 can be anchored to the housing by adhesive, although alternatives are possible.

The base ends 34 of the plurality of tensile reinforcing elements 28 can be anchored to the housing 38a on a side of the cable seals 24b, 24c opposite the sealed cable pass-through interface 32.

It will be appreciated that the cable seal 24 may be utilized in telecommunications enclosures that apply an external spring load to the cable seal 24 via some type of biasing member. In other examples, an external biasing member (not shown) may be mounted on the enclosure 10 for pressurizing the gel. According to some examples, the biasing member may be a spring member. The spring may be formed of any suitable material. For example, the spring can be formed of a metal such as steel, stainless steel or bronze. In some examples, other types of biasing members may be used. For example, the biasing member may include a coil spring, a Belleville washer, and elastomeric spring member, or a deformable/elastic containment structure (e.g., a bladder) filled with a compressible fluid.

The biasing member may be used to apply a compressive spring load to the cable seal 24. As a result, the biasing member may exert a sealing pressure around the telecommunications cable. The pressure applied to the telecommunications cable can be selectively set so that an effective seal is provided fully about the telecommunications cable. The telecommunications cable is not overloaded or overcompressed by the pressurized sealant. Such overloading may damage the telecommunications cable, particularly in the case of optical fibers.

Turning again to FIG. 3, the cable seal 24 can include an x-dimension X that extends along an x-axis, a y-dimension Y that extends along a y-axis, and a z-dimension Z that extends along a z-axis. In one example, the x-axis defines a length axis of the cable seal, the y-axis defines a height axis of the cable seal, and the z-axis defines a depth axis of the cable seal. In this example, the z-axis corresponds to a cable pass-through direction D3.

The anisotropic behavior of the cable seal 24 allows the cable seal 24 to move less along the z-axis or the cable pass-through direction D3 as compared to at least one of the x and y axes. Thus, deformation is preferred along the x and y axes as compared to the z-axis. For example, the cable seal 24 can be more flexible and/or flowable along the x and y axes while being more stiff and/or non-flowable, restricted along the z-axis. Because the cable seal 24 can have anisotropic deformation characteristics which resist deformation along the z-axis, a softer gel can be used without experiencing tenting during pressurization of the sealing structure. A softer gel can readily flow in the x and y dimensions when load pressure is applied to the cable seal 24. The pressure forces the gel to deform and move effectively around the telecommunications cable 30 through deformation in the x and y orientations due to the softness of the gel while the plurality of tensile reinforcement elements 28 limits movement in the cable pass-through direction D3 to reduce tenting and to provide effective gel containment. As a result, the stretching and/or telescoping effect of the cable seal 24 can be reduced to thereby help limit the eye and tent effects. In certain examples, the reinforcing structure can cause the gel of the cable sealing body to migrate in various directions about the telecommunications cable to create a complete seal while restricting movement in other areas or orientations.

Figure 9:
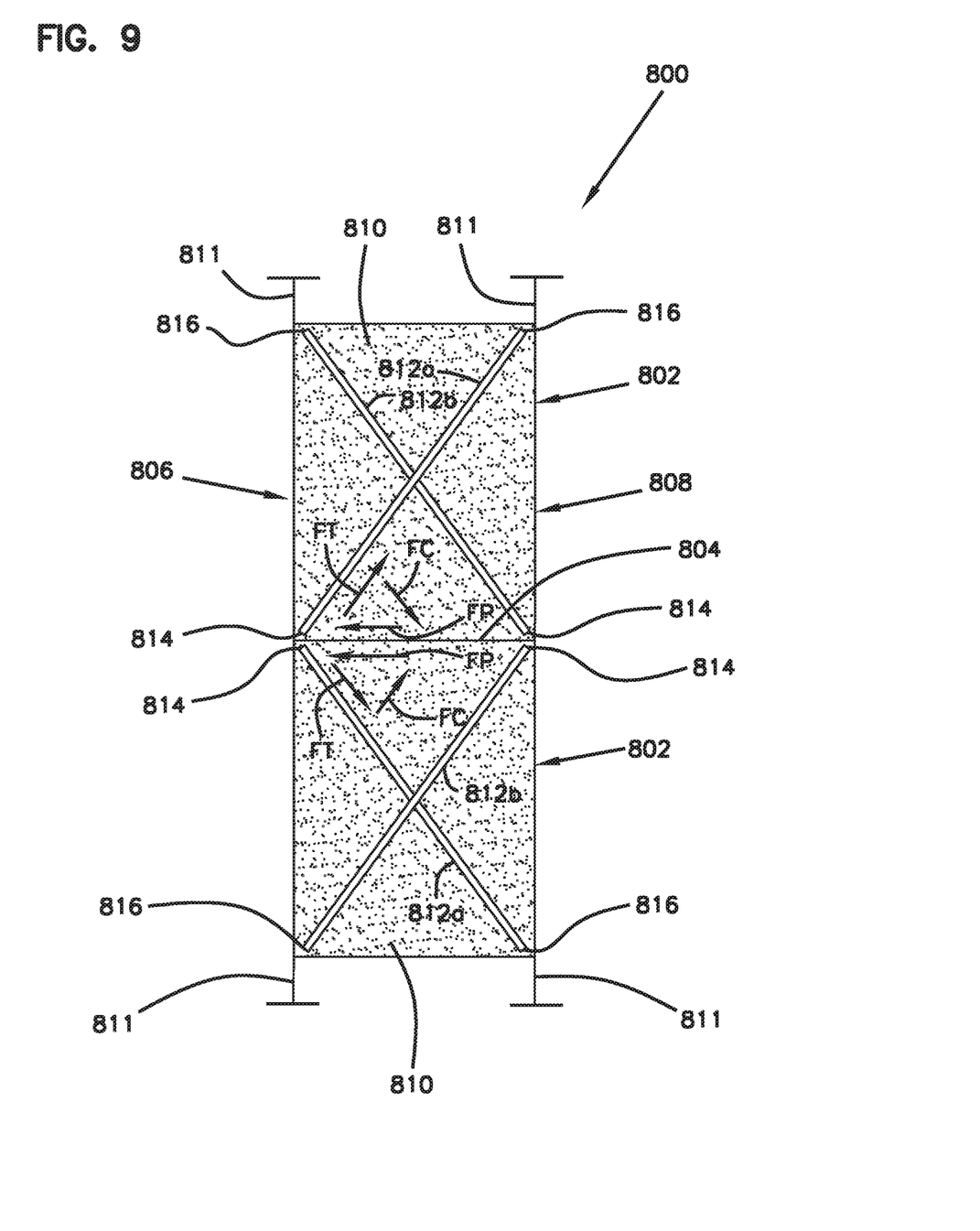
FIG. 9 illustrates a sealing arrangement in accordance with principles of the present disclosure.

FIG. 9 shows a sealing arrangement 800 in accordance with the principles of the present disclosure. The sealing arrangement 800 includes two sealing units 802 adapted to mount within an enclosure 811 (e.g., housing). The sealing units 802 contact one another at a cable pass-through interface 804 that extends between an outer boundary 806 of the sealing arrangement 800 and an inner boundary 808 of the sealing arrangement 800. The outer boundary 806 is adapted to face outside the enclosure 811, and the inner boundary 808 is adapted to face toward the interior of the enclosure 811. Each of the cable sealing units 802 includes a volume of sealant 810 (e.g., gel) and a plurality of reinforcing elements 812. The reinforcing elements are preferably tensile reinforcing elements that are sufficiently flexible to allow the reinforcing elements 812 to flex or bend to allow the volume of sealant 810 to deform to accommodate sealing of cables of different sizes desired to be passed through the cable pass-through interface 804. The reinforcing elements 812 preferably have sufficient tensile strength so as to generally not stretch when the sealing arrangement 800 is exposed to normally expected conditions and uses. The reinforcing elements 812 are embedded within the volume of sealant 810 and are preferably bonded along their lengths to the volume of sealant 810. Preferably, the reinforcing elements 812 are configured to assist in containing or retaining the volume of sealant 810 at the outer boundary 806 and the inner boundary 808. In certain examples, the reinforcing elements 812 have first ends 814 near the cable pass-through interface 804 that are preferably able to move relative to the enclosure 811, and second ends 816 that are preferably arranged in force transmitting relation relative to the enclosure 811 such that tensile loading can be readily transferred from the reinforcing elements 812 to the enclosure 811. In certain examples, the second ends 816 can be fixed or anchored directly to the enclosure 811, or can be fixed or anchored to another structure that is fixed or anchored relative to the enclosure 811. In other examples, the second ends 816 can be secured to a structure that directly contacts the enclosure or in certain examples is embedded in the sealant but is contained relative to the enclosure such that force can readily be transmitted between the structure and the enclosure through the gel without allowing meaningful movement of the second ends 816. In certain examples, the reinforcing elements 812 can be arranged in a diagonal configuration.

In certain examples, the reinforcing elements 812 are configured to resist outward deformation of the volume of sealant 810 at the outer boundary 806 and to resist inward deformation of the volume of sealant 810 at the inner boundary 808. For example, reinforcing elements 812a assist in resisting outward deformation of the volume of sealant 810 at the outer boundary 806 adjacent the cable pass-through interface 804. Similarly, reinforcing elements 812b are configured for resisting inward deformation of the volume of sealant 810 at the inner boundary 808 adjacent the cable pass-through interface 804. It will be appreciated that when elevated pressures are experienced within the interior of the enclosure 811, an outward force FP is applied to the sealing arrangement 800. This outward force FP forces the sealant arrangement 800 in an outward direction and encourages the cable sealing units 802 to deform outwardly adjacent the cable pass-through interface 804. This outward deformation is resisted by the reinforcing elements 812a. Specifically, as the cable sealing units 802 are forced outwardly by the outward force FP, the outward force FP is countered by tensile forces FT that are transmitted through the reinforcing elements 812a to the enclosure 811. Similarly, compression forces FC generated within the volume of sealant 810 as the sealing arrangement 800 deforms also counter the outward force FP. In this way, outward deformation of the sealing arrangement 800 at the outer boundary 806 is resisted. It will be appreciated that the reinforcing elements 812b provide similar resistance to deformation of the inner boundary 808 of the sealing arrangement 800 when an inward force is applied to the sealing arrangement 800.

Referring again to FIG. 7, because only the second ends 816 of the reinforcing elements 812 are fixed relative to the enclosure 811, the reinforcing elements 812 can pivot relative to the second ends 816 in response to deformation of the volume of sealant 810. However, because the reinforcing elements 812 are not adapted to stretch and the volume of sealant 810 is bonded to the reinforcing elements 812, the maximum the volume of sealant 810 can deform is defined by the length of the reinforcing elements 812. As shown at FIG. 7, maximum outer and inner deformation boundaries 818, 820 are schematically depicted in highly exaggerated form. In actual use, the transfer of tensile load to the enclosure 811 combined with the compression of the volume of sealant 810 during deformation limits the amount the reinforcing elements 812 actually pivot and therefore also limit the amount the outer or inner deformation boundaries 818, 820 can deform.

In certain examples, aspects of the present disclosure relate to cable sealant reinforcing arrangements that alter the force transfer dynamics within the sealant to provide for sealant retention at inner and outer boundaries of the sealant while not interfering with the sealant to readily deform to accept cables of different sizes.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:

1. A telecommunications enclosure comprising:
   a housing;
   a first cable seal including a volume of gel, the volume of gel including first and second opposite sides that are connected by third and fourth opposite sides; and
   a plurality of tensile reinforcing elements including a first set of fingers and a second set of fingers intermeshed with the first set of fingers, the first and second set of fingers being embedded in the volume of gel and bonded to the volume of gel, each one of the first and second sets of fingers of the plurality of tensile reinforcing elements being connected to a base positioned at the first side, the first set of fingers being angled from the base in a direction extending toward the second and third sides, and the second set of fingers being angled from the base in a direction extending toward the second and fourth sides;
   the plurality of tensile reinforcing elements being arranged in force transmitting relation relative to the housing of the telecommunications enclosure such that when a deformation force is applied to the volume of gel, the plurality of tensile reinforcing elements transfer tensile load to the housing of the telecommunications enclosure to resist deformation of the volume of gel.

2. The telecommunications enclosure of claim 1, further comprising a second cable seal configured to cooperate with the first cable seal to provide full sealing about a fiber optic cable.

3. The telecommunications enclosure of claim 2, wherein when the first and second cable seals are positioned one on top of the other, a sealed cable pass-through interface is defined therebetween.

4. The telecommunications enclosure of claim 3, wherein the plurality of tensile reinforcing elements each include a base end that is anchored, and a free end that is positioned near the sealed cable pass-through interface.

5. The telecommunications enclosure of claim 4, wherein each one of the base ends of the plurality of tensile reinforcing elements is anchored by an intermediate structure, wherein the intermediate structure is configured to transfer axial load to the housing.

6. The telecommunications enclosure of claim 5, wherein the intermediate structure is a plate.

7. The telecommunications enclosure of claim 3, wherein the plurality of tensile reinforcing elements are diagonally oriented relative to the sealed cable pass-through interface.

8. The telecommunications enclosure of claim 5, wherein the base ends of the plurality of tensile reinforcing elements are anchored to the intermediate structure by adhesive.

9. The telecommunications enclosure of claim 1, wherein the first cable seal has anisotropic deformation characteristics.

10. The telecommunications enclosure of claim 1, wherein the plurality of tensile reinforcing elements include a material selected from the following aramid, fiber, metal, or plastic.

11. The telecommunications enclosure of claim 1, wherein the plurality of tensile reinforcing elements are treated for adhesion prior to being embedded in the volume of gel.

12. The telecommunications enclosure of claim 1, wherein the first cable seal is capable of withstanding a compressive force of at least 300 N.

13. The telecommunications enclosure of claim 1, wherein the plurality of tensile reinforcing elements are adapted to move in a pivoting motion to resist deformation.

14. The telecommunications enclosure of claim 1, wherein first ends of the tensile reinforcing elements are movable relative to the housing and second ends of the tensile reinforcing elements are fixed relative to the housing.

15. A cable seal for use within a telecommunications enclosure, comprising:
    a volume of gel;
    a plurality of tensile reinforcing elements embedded in the volume of gel and bonded to the volume of gel, the plurality of tensile reinforcing elements including a first set of fingers and a second set of fingers intermeshed with the first set of fingers, the first and second sets of fingers being angled at oblique angles relative to one another, the first and second sets of fingers each including a base end that is anchored and a free end; and
    a base plate;
    wherein the base end of each one of the first and second sets of fingers of the plurality of tensile reinforcing elements is anchored to the base plate and arranged in force transmitting relation relative to the telecommunications enclosure such that when a deformation force is applied to the volume of gel, the first and second sets of fingers of the plurality of tensile reinforcing elements transfer tensile load to the telecommunications enclosure to resist deformation of the volume of gel.

16. The cable seal of claim 15, wherein the base plate is embedded in the volume of gel.

17. The cable seal of claim 15, wherein the base plate is bonded to an end face of the cable seal.

18. The cable seal of claim 15, wherein the plurality of tensile reinforcing elements are diagonally oriented relative to the base plate.

19. The cable seal of claim 15, further comprising anisotropic deformation characteristics.

20. The cable seal of claim 15, wherein the plurality of tensile reinforcing elements includes a material selected from the following aramid, fiber, metal, or plastic.

21. The cable seal of claim 15, wherein the cable seal is capable of withstanding a compressive force of at least 300 N.

22. The telecommunications enclosure of claim 1, wherein the plurality of tensile reinforcing elements are adapted to freely bend with the volume of gel to provide free shape adaptation to any cable being sealed.

23. A telecommunications enclosure comprising:
    a housing; and
    a first cable seal including a volume of gel and a plurality of tensile reinforcing elements embedded in the volume of gel and bonded to the volume of gel;
    the plurality of tensile reinforcing elements being arranged in force transmitting relation relative to the housing of the telecommunications enclosure such that when a deformation force is applied to the volume of gel, the plurality of tensile reinforcing elements transfer tensile load to the housing of the telecommunications enclosure to resist deformation of the volume of gel; and
    a second cable seal configured to cooperate with the first cable seal to provide full sealing about a fiber optic cable;
    wherein when the first and second cable seals are positioned one on top of the other, a sealed cable pass-through interface is defined therebetween;

wherein the plurality of tensile reinforcing elements each include a base end that is anchored, and a free end that is positioned near the sealed cable pass-through interface;

wherein each one of the base ends of the plurality of tensile reinforcing elements is anchored by an intermediate structure, wherein the intermediate structure is configured to transfer axial load to the housing; and wherein the base ends of the plurality of tensile reinforcing elements are anchored to the intermediate structure by adhesive.

\* \* \* \* \*